Figure 1:
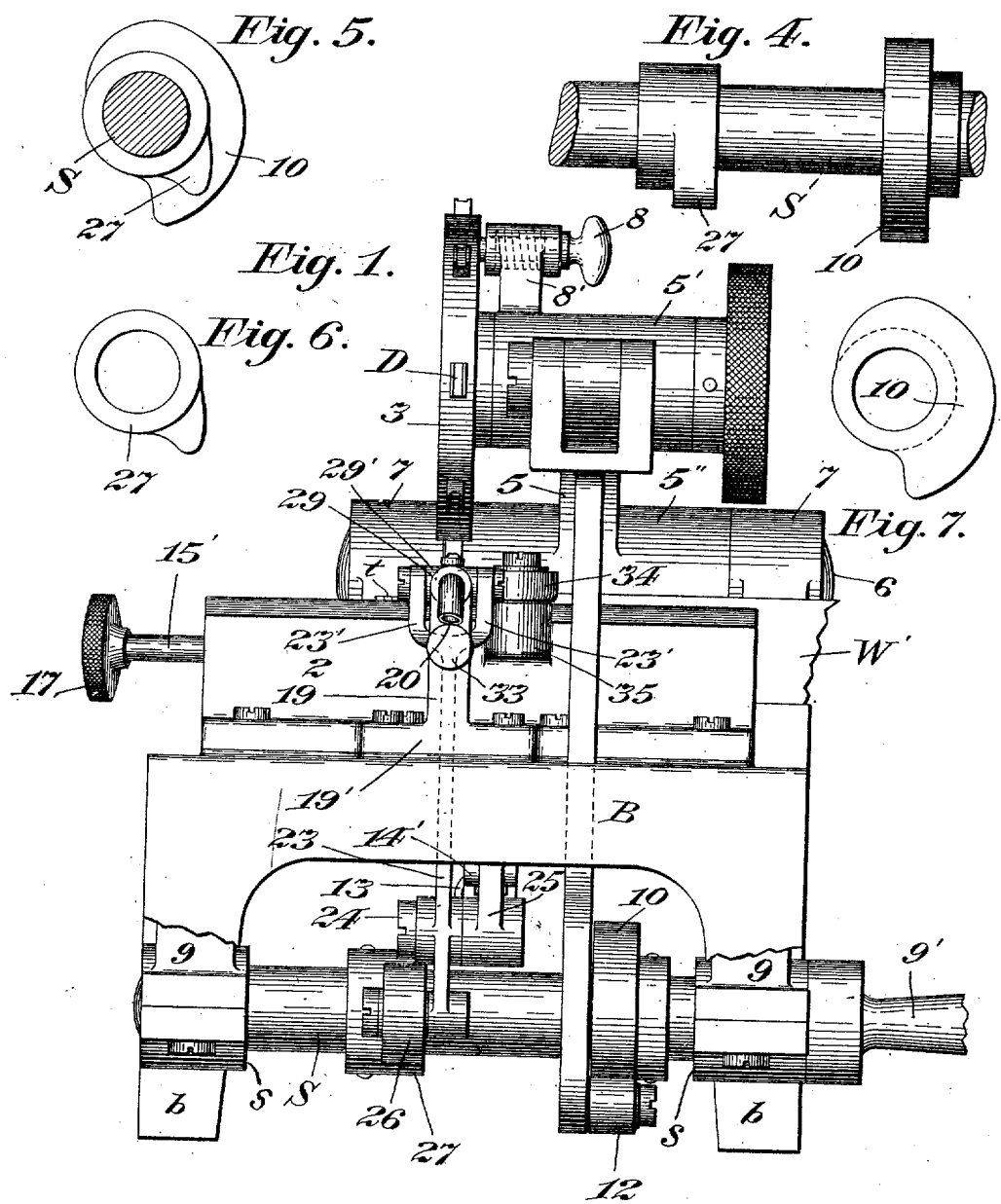

No. 886,331. PATENTED APR. 28, 1908.
F. H. RICHARDS.
MANUFACTURE OF TYPE AND TYPE BARS.
APPLICATION FILED DEC. 1, 1902. RENEWED MAR. 11, 1908.

5 SHEETS—SHEET 2.

Witnesses:
D. H. Blakelock
A. C. Abbott

Inventor:
F. H. Richards.

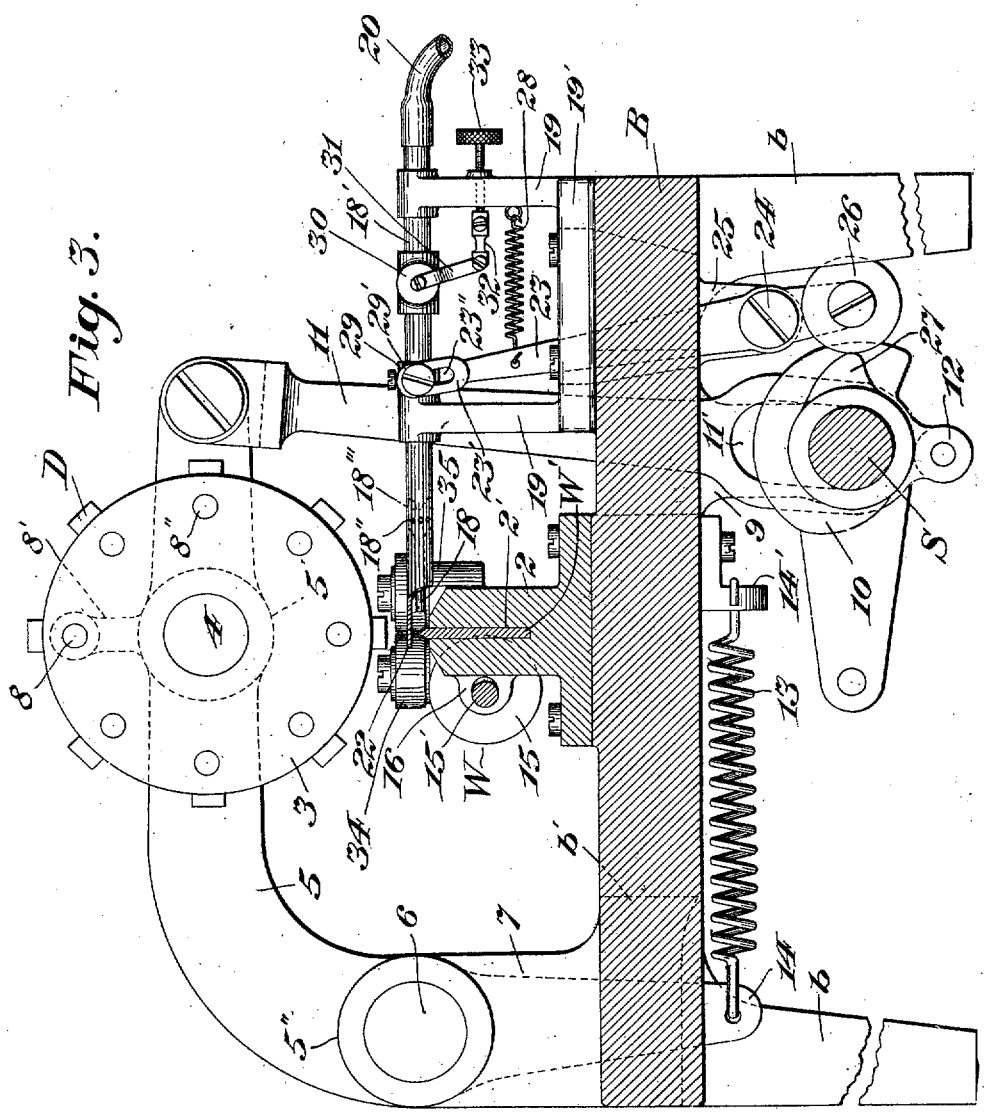

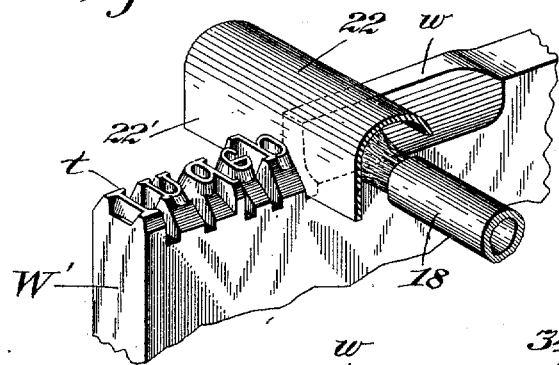
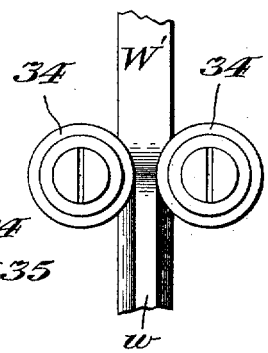
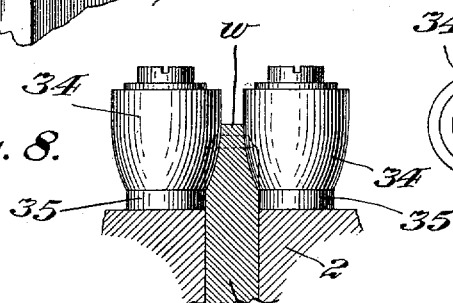
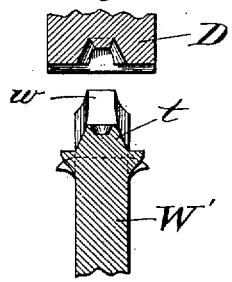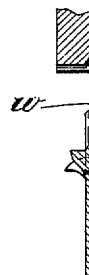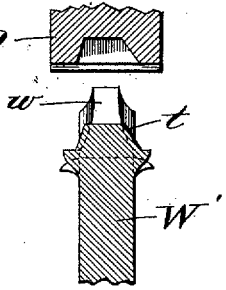

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

MANUFACTURE OF TYPE AND TYPE-BARS.

No. 886,331.      Specification of Letters Patent.      Patented April 28, 1908.

Application filed December 1, 1902, Serial No. 133,383. Renewed March 11, 1908. Serial No. 420,448.

*To all whom it may concern:*

Be it known that I, FRANCIS H. RICHARDS, a citizen of the United States, residing at Hartford, in the county of Hartford and State of Connecticut, have invented certain new and useful Improvements in Manufacture of Types and Type-Bars, of which the following is a specification.

This invention relates to means for manufacturing die-made characters, such for instance as types, by the aid of heat from an extraneous source which serves to reduce the internal cohesion of the material of the blank and thereby facilitate the die-forming of the character.

In the practical application of the present invention to the manufacture of a logotype or line of type, the heat from the extraneous source is applied to the successive portions of the blank upon which the dies or like instrumentalities, when properly selected and located, operate to form a desired succession of types.

The source of heat will usually be a stream of heated fluid, such as heated air or a gas flame, and in the practical operation of a mechanism for manufacturing a succession of types in accordance with the present improvements, the heating agent is directly applied to the portion of the blank located at the working point and upon which the die next to operate comes into contact; in point of time the heat is applied immediately prior to the operation of the die.

To more freely permit the carrying out of the die treatment or operation the means for heating the type-blank portion may be drawn backward out of the way just before the die operation begins, and in order that the die and the mechanism associated therewith for its operation shall be the more effectually protected from the heat used for heating the blank, suitable guard-like devices will ordinarily be employed for shielding them. These devices are preferably of such construction and organization as to confine the application of the heating agent to the comparatively small portion of the edge of the blank with which the die next operating is to engage.

A further feature of the present invention relates to the cross-sectional conformation or contour of the type-forming edge of the blank. This will preferably be somewhat tapering for the reason that by employing a blank whose side faces converge toward each other, presenting a relatively narrow face to the dies, the type-forming portion of the blank, that is, the portion from which the type lines and bodies are made is raised to the necessary and proper temperature more quickly than the lower and wider portions of the blank in which a comparatively great degree of rigidity should be preserved during the type-making operation to effectually resist the crushing down tendencies of the manipulations to which the material is subjected by the dies.

In the drawings which accompany the present specification there is set forth a mechanism organized to make a succession of types (a logotype or line of type) and using a stream of heated fluid directed in succession against successive type-forming portions of the edge of the blank.

Figure 2:
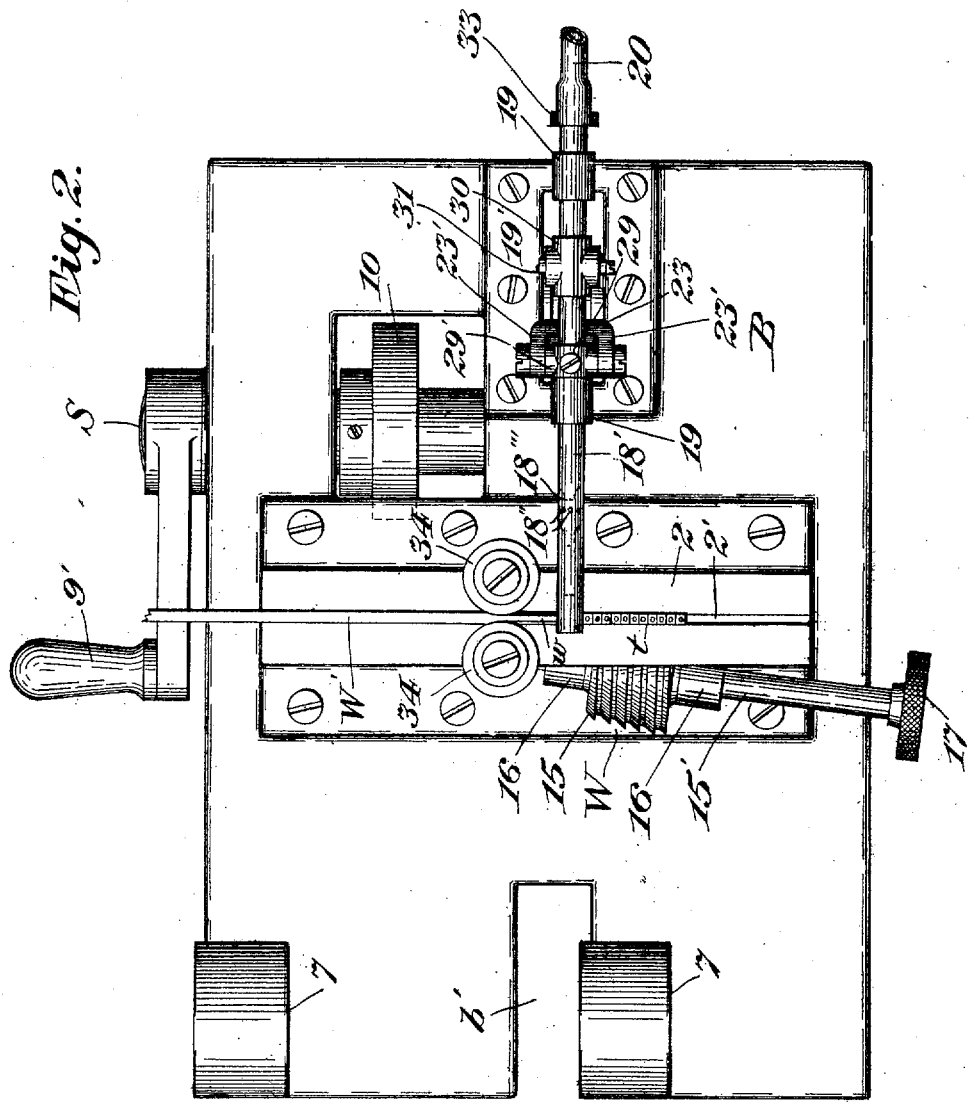
Figure 14:
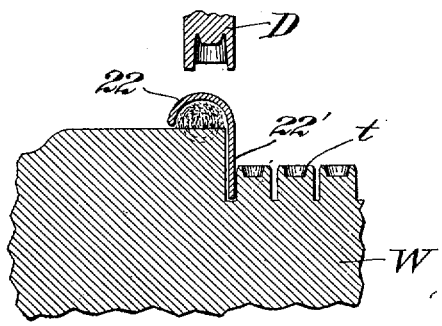
Figure 15:
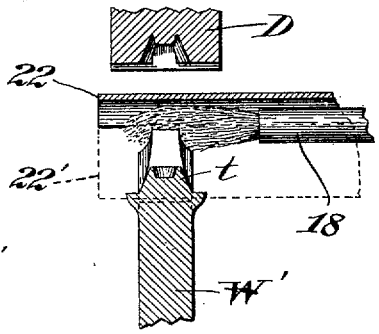
Figure 16:
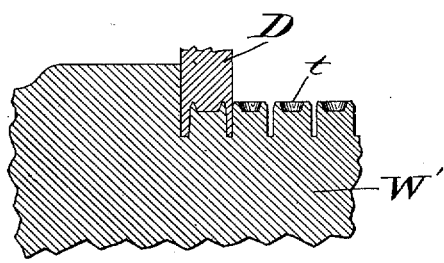
Figure 17:
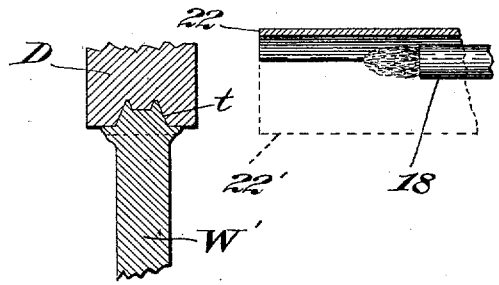

In these drawings, Figure 1 is a side elevation of such a mechanism, certain portions of the supporting frame upon which the various parts of the mechanism are mounted being removed to more clearly show parts lying beyond. Fig. 2 is a plan view, the die carrier and the swing frame upon which it is mounted being removed in this figure. Fig. 3 is a vertical section on the plane of the line 3—3 in Fig. 1. Fig. 4 is an elevation of a portion of the main or driving shaft illustrating a pair of cams mounted thereon which cams are effective to feed the die and blank against each other in forming the type and to cause the approach and recession of the nozzle for the heated air toward and from the blank in the blank holder of the machine. Fig. 5 is an end elevation of the parts set forth in Fig. 4. Figs. 6 and 7 are views of the cams indicated in Figs. 4 and 5. Fig. 8 is partly an elevation and partly a section illustrating the manner in which the forming rolls act upon the edge portion of the blank to cause the side faces of the latter at and adjacent to its extreme upper or type-forming edge to converge toward each other. Fig. 9 is a plan view of the parts set forth in Fig. 8. Fig. 10 is a perspective view showing the relation of the delivery nozzle to the edge of the blank which is established during the operation of the machine and immediately prior to the making of a type, this figure also illustrating a guard employed for the purpose of confining the action of the heating agent to that portion of the blank with which the die next operating is to come into contact. Figs. 11, 12 and 13 are sectional views, the plane of each section being disposed in line with the axis of the die and transversely of the blank in the blank holder, these several views indicating the relation of the blank to dies adapted for making different types after such dies have been withdrawn from contact with the types made by them on the blank. Fig. 14 is a sectional view of a die, the blank and the aforesaid guard, and illustrates the parts in the position taken by them immediately before the making of the type by the selected die and while the portion of the blank under the die is being heated. Fig. 15 is a sectional view of the parts in the position indicated in Fig. 14, the section of the plane being at right angles to that yielding the latter figure. Fig. 16 is a view similar to Fig. 14, but in this figure the guard and the delivery nozzle for the stream of heated fluid are assumed to have been withdrawn and the die to have descended and completed the making of the type; and Fig. 17 is a sectional view corresponding to Fig. 15 but representing the parts in the position they have assumed in Fig 16.

Similar characters of reference designate corresponding parts in all figures.

The particular organization of mechanism which I have adopted in the present instance for illustrating an application of my present invention is one in which a plurality of selective dies are capable of being brought one after another in a desired succession to the working point and when a die is there located the blank may be forced against the die to form on the blank a type. Thereafter the die may be withdrawn from engagement with the blank and the latter shifted lengthwise of its supporting guide or holder to bring the next type-making portion of the edge of the blank to the working point.

The application of the present invention is not restricted to any particular construction of parts or to any particular species of type or typebar-making mechanism in which types, typebars or logotypes are made through the instrumentality of dies which serve to impress the edge of the blank. Referring however to the particular mechanism set forth in the drawings attached to the present specification, the same is supported upon a base or bed B which may be supported by legs such as $b$. The holder for the blank is designated by 2 and the same is secured to the base or bed B and is provided with a slot 2′ whose sides sustain the blank against the operation of the dies; through this slot the blank may be shifted or fed step-by-step by means that will be adverted to later.

An appropriate number of dies will be employed depending upon the uses to which the machine is applied. In the present instance but a comparatively small number of these dies are indicated and the same are designated without preference by D. For convenience in the selection and adjustment of a determinate die to the working point of the machine these dies may be supported on a carrier, which latter is in this instance in the nature of a die wheel 3, whose shaft 4 is journaled in the hub 5′ of an arm 5. In the particular organization herein disclosed the feeding of a selected die and the blank together results from a feed movement of the die carrier which movement is conveniently effected by making the aforesaid arm 5 a swing arm and journaling the same upon a pin such as 6 extending between uprights such as 7, 7, erected upon the base plate B. A spring pressed locking pin 8 is shown for securely holding the die carrier in an adjusted position; this pin is mounted in an arm 8′ extending from the hub 5′ and can be inserted in any one of a number of openings 8″ in the die carrier and in co-ordinate relation with the dies thereon.

S is the main or driving shaft of the machine, and the same is in this instance journaled in bearings $s, s$ supported by corresponding brackets 9 extending downward from the lower surface of the base plate B. It is during the rotation of this shaft that the various operations involved in making a type are performed, and in the simple character of mechanism illustrated in the drawings, a crank handle 9′ is indicated as a means for rotating the shaft.

The to-and-fro movement of the die carrier 3 involved in the approach of a located die toward the blank, the feed of such die into the edge thereof and the recession of the carrier until it regains its normal position is effected from the driving shaft S in this instance through the instrumentality of a cam such as 10 secured to the shaft and having the proper contour to give the proper movements to the swing arm 5 through an intermediate connection which in the form thereof illustrated comprises a link 11 pivoted at one end to the free end of the arm 5 and carrying a cam roll 12 adapted to bear against the periphery of the cam 10. This link 11 is in this instance slotted, see the slot 11′, to embrace the shaft S and be guided thereby, and the cam roll 12 is caused to firmly press against the periphery of the cam 10 through the tension of a spring 13 secured at one end to an arm 14 working in a slot $b'$ in the base B and depending from the hub portion 5″ of the arm 5 surrounding the pin 6, and at the other end to the arm of a bracket 14′ secured to the lower surface of the base plate B. Some means suitable for the purpose will be employed for shifting the blank, such as W (whether the same be in short lengths or in ribbon form) through the slot 2′ of the blank holder. In the particular form of such feed device illustrated the same consists of a feed screw 15 whose operating shaft 15′ is journaled in bearings 16, 16 in such position as to adapt the teeth of the feed screw to engage with the side face of the blank. A thumb wheel 17 on the shaft 15' of the feed screw is indicative of a means for manipulating the latter and shifting the blank forward step-by-step.

Referring now in detail to means for heating the blank and which heating constitutes an important feature of the present invention, it may be stated in a general way that the invention includes means for heating the type-forming edge of the blank, analogous in its mode of operation with respect to its effecting a succession of distinct and successive heat applications to the intermittent working of the dies along the edge of the blank; like the application of the dies, the heat is applied to successive type-forming portions of the edge of the blank. The mechanism through whose operation such applications of the heating agent is made is so organized and timed, however, as to cause the heating of any one portion of the blank to take place immediately before the proper die comes into engagement with such portion.

In the particular way in which the various elements are herein combined and related, and since, furthermore, guard devices are preferably employed for protecting the types already formed as well as the die mechanism from the action of the heat, these guard devices would naturally when in proper position for affording such protection, interfere with the operation of making a type. The means for causing the impingement of the stream of heated air or gas, or the flame against the edge of the blank and also the guards for protecting the parts enumerated are therefore given a reciprocatory movement toward and away from the edge of the blank. Under these conditions, when the guards and discharge nozzle are in their innermost position, (during which time the die carrier is withdrawn and the die thereon is wholly disengaged from the blank) the next portion of the blank to be subjected to the action of a die is being heated. When the temperature of such portion shall have been raised a sufficient amount, the parts are caused to recede to their furthermost backward position and the blank is then free to have the die operate upon it.

In the particular embodiment of the invention herein disclosed, the blank is heated by a gas flame which burns at a nozzle 18, gas-fed through a delivery pipe 18' mounted to reciprocate in uprights 19, 19, erected on an auxiliary bed-piece 19' attached to the base plate B. A flexible gas supply conduit such as 20 is attached to the end of delivery pipe 18', and in this instance the gas flame is a burner flame the nozzle 18 being somewhat smaller than the encircling delivery pipe and air passing in through perforations 18" to mix with the gas issuing from the orifice 18'''. The inner end of the pipe 18' is, in the construction of guard illustrated, suitably formed to constitute such guard or shield 22 adapted when the flame, etc., is impinging against the portion of the blank at the working point, to confine the heat to the blank and prevent the same from being communicated to the die immediately above it. I prefer, moreover, that this shield shall be so formed as to protect the completed types at the rear; for this purpose the shield has in this instance a downwardly-extending lip 22' adapted to enter the space separating the type last made from the portion of the edge of the blank immediately in advance.

The simple means indicated for effecting the reciprocatory motion, as aforesaid, of the shield and the leading-in or supply pipe 18' is operated from the main driving shaft S, and comprises in the form thereof shown a rock arm 23 pivoted intermediate its ends by a pivot pin 24 to a lug 25 depending from the lower surface of the base plate B. Adjacent to its lower end this rock arm carries an antifriction or cam roll 26 adapted to bear against the surface of a cam 27 mounted on the main shaft S; contact between the two is assured by a spring 28. At its upper end the rock lever 23 is bifurcated and the side arms 23' slotted, see the slots 23'', to embrace trunnions 29' extending from a collar 29 fixed to the tubular member or pipe 18'. The cam 27 is so formed and its operation is so related to the operation of the cam 10 as to produce the timed reciprocation of the shield and leading-in pipe already referred to.

I may combine with the heating device means for more or less fully shutting off the flow of heated air during such time as the leading-in pipe is withdrawn from close proximity to the blank. Such regulation of the flow of the heating agent may be effected automatically through the operation of a suitable valve, such as 30, in the supply pipe 18', the arm 31 of which valve is connected by a link 32 with a relatively fixed point; this latter may be made adjustable for the purpose of regulating the extent to which the flow is first opened and then shut off. As illustrated herein the link 32 is connected with an adjustable screw 33 passing through a threaded opening in one of the uprights 19.

A further particular feature of the present invention and which is designed more especially to localize the heat in those portions of the blank more immediately concerned in the making of the successive types—to wit: the edge of the blank. To effect such result, the edge is preferably of a relatively smaller cross-section than the portion of the blank below, and the rigidity of which is concerned in supporting the forming type during the subjection of the metal thereof to the treatment of the die. By making the extreme upper edge of the blank somewhat narrower than the main body of the blank that is by beveling or tapering the upper portion of the blank, the edge is brought to a temperature sufficient to decrease the cohesion of the metal more quickly than the main body of the blank and thus the forming operation of the working die is assisted. As regards the extent to which the upper portion of the blank is tapered as the same appears in cross-section, this will be governed by the relative widths, crosswise of the blank, of the types which are to be formed and such width will ordinarily be such as corresponds approximately to the width of the narrowest character or type to be made, thus requiring the lateral flow of the metal in the die in the making of characters or types of greater widths.

The blank may be presented to the machine with the upper portions of its side faces beveled, or I may so mount forming rolls, such as 34, 34, upon the machine as to compel the successive portions of the blank to be forced between them some time before such portions reach the working point. These rolls are mounted, in the construction shown, upon bosses 35, 35 of the blank holder 2 and are of such form and are placed such a distance apart as to cause the beveling of the upper edge w of the blank to the desired amount.

A mechanism such as has been hereinbefore described operates substantially in the following manner: Assuming the die carrier 3 to have been adjusted so as to bring the desired die to the working point and to be locked in this position by the locking pin, the crank 9' may thereupon be turned. Prior to the time in which the cam 10 comes into contact with the cam roll 12 to force the latter down and hence feed the die against the blank, the leading-in pipe 18' will have projected the gas flame against that portion of the blank under the located die. As the crank 9' is turned the cam 27 retreats from the antifriction roll 26 permitting the spring 28 to withdraw the leading-in pipe and the shields 22, 22', and shut off the gas supply following which the die carrier is moved downward and the die forced into the blank by the cam 10. Further movement of the shaft S results in the retreat of the die and the reëngagement of the cam 27 with the anti-friction roll 26. The leading-in pipe 18 now advances and the valve 30 is operated to further open the passage through such pipe and permit the full flame to play on the edge of the blank. The feed screw 17 may in the meantime be adjusted to shift the formed type such as t (designated without preference) and bring the next portion of the blank to the working point, during which shifting movement the forming rolls 34, 34 operate to bevel the edge of the blank and give to the same a tapering form.

A repetition of the operations and movements just described suffices to produce a desired succession of types along the edge of the blank, while word separating spaces may be made by a space forming die analogous in operation to the type making dies.

Having thus described my invention, I claim—

1. In a type making mechanism, means for heating the edge of the blank while the blank and heating means move relatively to each other in combination with means for imparting relative movement to the blank and heating means.

2. The combination with a plurality of selective dies and mechanism for causing the operation of selected dies in succession, of means for heating each type-making portion of the blank immediately before the die is applied thereto to form a type.

3. The combination with a plurality of selective dies, and mechanism for causing the selected dies to operate in succession, of a heating device, and mechanism for moving said device into and out of operative position.

4. The combination with type-making mechanism adapted to make types on a blank, of a heating device, and means organized and timed to cause the operation of said type-making mechanism to alternate with the action of said device in heating the blank.

5. The combination with mechanism adapted to operate intermittently and make a succession of type one after another along a blank, of means for heating each type-blank portion of the blank prior to the operation of the mechanism to make thereon a type.

6. The combination with a plurality of selective dies and mechanism for causing the operation of selected dies in succession, of means for heating each type-blank portion of the blank immediately before the die is applied thereto to form a type, and mechanism for shifting the type last made away from the working point and bringing the next type-blank portion thereto.

7. The combination with a plurality of selective dies, and mechanism for causing the selected dies to operate in succession, of a heating device, mechanism for moving said device into and out of operative position, and mechanism for shifting the type last made away from the working point and bringing the next type-blank portion thereto.

8. The combination with type-making mechanism adapted to make types on a blank, of a heating device, means organized and timed to cause the operation of said type-making mechanism to alternate with the action of said device in heating the blank, and mechanism for shifting the type last made away from the working point and bringing the next type-blank portion thereto.

9. The combination with mechanism adapted to operate intermittently and make a succession of types one after another along a blank, of means for heating each type-blank portion of the blank prior to the operation of the type-making mechanism to make thereon a type, and mechanism for shifting the type last made away from the working point and bringing the next type-blank portion thereto.

10. The combination with a plurality of selective dies, of a blank holder, mechanism for shifting a blank step by step therethrough, and means for projecting a stream of heated fluid against the blank.

11. The combination with a plurality of selective dies, of a blank holder, mechanism for shifting a blank step by step therethrough, and means for projecting a stream of heated fluid against the successive portions of the blank subjected to the successive action of the dies.

12. The combination with a plurality of selective dies, of a blank holder, mechanism for shifting a blank step by step therethrough, and means for projecting a stream of heated fluid against the successive portions of the blank subjected to the successive action of the dies and for suppressing such projection during each type-making operation.

13. The combination of a plurality of selective dies, a blank holder, mechanism for feeding the dies against the blank in the blank holder, mechanism for shifting the blank step by step therethrough, and a reciprocative heating device for heating the type-blank portions of the blank in succession.

14. The combination of a plurality of selective dies, a blank holder, mechanism for feeding the dies against the blank in the blank holder, mechanism for shifting the blank step by step therethrough, a reciprocative heating device for heating the type-blank portions of the blank in succession, a driving shaft and mechanism controlled thereby for causing the operation of the dies to alternate with the movement of said reciprocative heating device.

15. The combination of a plurality of selective dies, a blank holder, mechanism for feeding the dies against the blank in the blank holder, mechanism for shifting the blank step by step through such holder, and a reciprocative gas supply pipe.

16. The combination of a plurality of selective dies, a blank holder, mechanism for feeding the dies against the blank in the blank holder, mechanism for shifting the blank step by step therethrough, a reciprocative gas supply pipe for heating the type-blank portions of the blank in succession, a driving shaft and mechanism controlled thereby for causing the operation of the dies to alternate with the reciprocative movement of said gas supply pipe.

17. The combination of a plurality of selective dies, a blank holder, mechanism for feeding the dies against the blank in the blank holder, mechanism for shifting the blank step by step therethrough, a reciprocative heating device for heating the type-blank portions of the blank in succession, and a reciprocative guard for shielding the dies from the action of the heating device.

18. The combination of a plurality of selective dies, a blank holder, mechanism for feeding the dies against the blank in the blank holder, mechanism for shifting the blank step by step therethrough, a reciprocative heating device for heating the type-blank portions of the blank in succession, a driving shaft, mechanism controlled thereby for causing the operation of the dies to alternate with the movement of said reciprocative device, and a reciprocative guard for shielding the dies from the action of the heating device.

19. The combination of a plurality of selective dies, a blank holder, mechanism for feeding the dies against the blank in the blank holder, mechanism for shifting the blank step by step through such holder, a reciprocative gas supply pipe, and a reciprocative guard for shielding the dies from the heating action of the burning gas.

20. The combination of a plurality of selective dies, a blank holder, mechanism for feeding the dies against the blank in the blank holder, mechanism for shifting the blank step by step therethrough, a reciprocative gas supply pipe for heating the type-blank portions of the blank in succession, a driving shaft, mechanism controlled thereby for causing the operation of the dies to alternate with the movement of said gas supply pipe, and a reciprocative guard for shielding the dies from the heating action of the burning gas.

21. The combination of a plurality of selective dies, a blank holder, mechanism for feeding the dies against the blank in the blank holder, mechanism for shifting the blank step by step therethrough, a reciprocative gas supply pipe for heating the type-blank portions of the blank in succession, and a guard reciprocative in unison with the gas supply pipe.

22. The combination of a plurality of selective dies, a blank holder, mechanism for feeding the dies against the blank in the blank holder, mechanism for shifting the blank step by step therethrough, a reciprocative gas supply pipe for heating the type-blank portions of the blank in succession, a driving shaft, mechanism controlled thereby for causing the operation of the disk to alternate with the movement of said reciprocative gas supply pipe, and a guard reciprocative in unison with said gas supply pipe.

23. The combination of a plurality of selective dies, a blank holder, mechanism for feeding the dies against the blank in the blank holder, mechanism for shifting the blank step by step therethrough, a reciprocative heating device for heating the type-blank portions of the blank in succession, and a guard having a lip adapted to enter the space between the type last made and the portion of the edge of the blank in advance thereof.

24. The combination of a plurality of selective dies, a blank holder, mechanism for feeding the dies against the blank in the blank holder, mechanism for shifting the blank step by step therethrough, a reciprocative heating device for heating the type-blank portions of the blank in succession, a driving shaft, mechanism controlled thereby for causing the operation of the dies to alternate with the movement of said reciprocative heating device, and a guard having a lip adapted to enter the space between the type last made and the portion of the edge of the blank in advance thereof.

25. The combination of a plurality of selective dies, a blank holder, mechanism for feeding the dies against the blank in the blank holder, mechanism for shifting the blank step by step through such holder, a reciprocative gas supply, and a guard having a lip adapted to enter the space between the type last made and the portion of the edge of the blank in advance thereof.

26. The combination of a plurality of selective dies, a blank holder, mechanism for feeding the dies against the blank in the blank holder, mechanism for shifting the blank step by step therethrough, a reciprocative gas supply pipe for heating the type-blank portions of the blank in succession, a driving shaft, mechanism controlled thereby for causing the operation of the dies to alternate with the movement of said gas supply pipe, and a guard having a lip adapted to enter the space between the type last made and the portion of the edge of the blank in advance thereof.

27. The combination of a plurality of selective dies, a blank holder, mechanism for feeding the dies against the blank in the blank holder, mechanism for shifting the blank step by step therethrough, a reciprocative heating device for heating the type-blank portions of the blank in succession, a reciprocative guard for shielding the dies from the action of the heating device, and a guard adapted to enter the space between the type last made and the portion of the edge of the blank in advance thereof.

28. The combination of a plurality of selective dies, a blank holder, mechanism for feeding the dies against a blank having beveled side faces in the blank holder, mechanism for shifting the blank step by step therethrough, and a reciprocative heating device for heating the type-blank portions of the blank in succession.

29. The combination of a plurality of selective dies, a blank holder, mechanism for feeding the dies against a blank having beveled side faces in the blank holder, mechanism for shifting the blank step by step therethrough, a reciprocative heating device for heating the type-blank portions of the blank in succession, a driving shaft and mechanism controlled thereby for causing the operation of the dies to alternate with the movement of said reciprocative heating device.

30. The combination of a plurality of selective dies, a blank holder, mechanism for feeding the dies against a blank having beveled side faces in the blank holder, mechanism for shifting the blank step by step through such holder, and a reciprocative gas supply pipe.

31. The combination of a plurality of selective dies, a blank holder, mechanism for feeding the dies against a blank having beveled side faces in the blank holder, mechanism for shifting the blank step by step therethrough, a reciprocative gas supply pipe for heating the type-blank portions of the blank in succession, a driving shaft and mechanism controlled thereby for causing the operation of the dies to alternate with the movement of said gas supply pipe.

32. The combination of a plurality of selective dies, a blank holder, mechanism for feeding the dies against a blank having beveled side faces in the blank holder, mechanism for shifting the blank step by step therethrough, a reciprocative heating device for heating the type-blank portions of the blank in succession, and a reciprocative guard for shielding the dies from the action of the heating device.

33. The combination of a plurality of selective dies, a blank holder, mechanism for feeding the dies against a blank having beveled side faces in the blank holder, mechanism for shifting the blank step by step therethrough, a reciprocative heating device for heating the type-blank portions of the blank in succession, a driving shaft, mechanism controlled thereby for causing the operation of the dies to alternate with the movement of said reciprocative heating device, and a reciprocative guard for shielding the dies from the action of the heating device.

34. The combination of a plurality of selective dies, a blank holder, mechanism for feeding the dies against a blank having beveled side faces in the blank holder, mechanism for shifting the blank step by step through such holder, a reciprocative gas supply pipe, and a reciprocative guard for shielding the dies from the action of the burning gas.

35. The combination of a plurality of se lective dies, a blank holder, mechanism for feeding the dies against the blank in the blank holder, mechanism for shifting the blank step by step therethrough, a reciprocative gas supply pipe for supplying a flame to heat in succession each type-blank portion of the blank, and means for automatically shutting off the gas supply upon the retraction of the gas supply pipe.

36. The combination of a plurality of selective dies, a blank holder, mechanism for feeding the dies against the blank in the blank holder, mechanism for shifting the blank step by step therethrough, a reciprocative gas supply pipe for supplying a flame to heat in succession each type-blank portion of the blank, a valve in such supply pipe and an arm on such valve connected to a relatively fixed point.

37. The combination of a plurality of selective dies, a blank holder, mechanism for feeding the dies against the blank in the blank holder, mechanism for shifting the blank therein step by step therethrough, a reciprocative gas supply pipe for supplying a flame to heat in succession each type-blank portion of the blank, means for automatically shutting off the gas supply upon the retraction of the gas supply pipe, a driving shaft, and cams thereon for effecting the feeding of a selected die and the blank in the blank holder together and the reciprocatory movement of the gas supply pipe to withdraw the same from proximity to the blank during the type-making operation.

38. The combination of a plurality of selective dies, a blank holder, mechanism for feeding the dies against the blank in the blank holder, mechanism for shifting the blank step by step therethrough, a reciprocative gas supply pipe for supplying a flame to heat in succession each type-blank portion of the blank, a valve in such supply pipe, an arm on such valve connected to a relatively fixed point, a driving shaft, and cams thereon for effecting the feeding of a selected die and the blank in the blank holder together and the reciprocatory movement of the gas supply pipe to withdraw the same from proximity to the blank during the type-making operation.

39. In a type making mechanism, the combination of a plurality of selective dies, a blank holder, mechanism for feeding the dies against the blank in the blank holder, mechanism for shifting the blank step by step to such holder, a reciprocative guard supply pipe, and a reciprocative guard for shielding the dies from the heating action of the heated gas.

40. In a type making mechanism, means for operating on the edge of the blank to heat it while the blank and heating means reciprocate relative to one another in combination with means for imparting relative reciprocation to the blank and heating means.

41. In a type making mechanism, means coöperating with the edge of the blank to heat it while the blank and heating means move back and forth relative to one another in combination with means for imparting relative back and forth movement of the blank and heating means.

42. The combination with mechanism embodying dies, adapted to act upon a blank, of means for separately heating each type head forming portion of the blank before the die is applied thereto to form a type.

43. The combination with mechanism adapted to make types on a blank, of a to and fro movable heating device directed to the heating of the blank along its edge.

44. The combination with type making mechanism adapted to make types on a blank, of a heating device having a to and fro movement and directed to heat certain portions of the type blank before the forming of the type.

45. In a type making mechanism, means for heating the edge of the blank while the blank and heating means move relatively to each other, in combination with means for imparting relative movement to the blank and heating means, and means for forming a character on the heated edge of the blank.

46. In a type making mechanism, the combination of a plurality of dies, a blank supporter, mechanism for feeding the dies, mechanism for manipulating the blank, means for successively heating type head portions of the blank and concurrently shielding the body portions.

47. In a type making mechanism, the combination of a die, a blank holder, mechanism for operating the die, mechanism for actuating the blank, means for heating one type receiving portion of the blank during the type formative action upon a contiguous type receiving portion, and means for shielding the die from the heat of the heating means.

48. In typographic mechanism, the combination with type forming instrumentalities, of means for holding a blank for the operation thereof, and means for heating a portion restricted longitudinally and laterally of the blank.

49. In typographic mechanism, the combination with type forming dies, of a blank holder, means for moving the blank step by step for bringing successive portions thereof into the field of activity of the dies, and means for heating those portions only of the blank which are so moved into such field.

50. In a type making mechanism, the combination with means for holding a blank, and means for sequentially heating predetermined separated portions of the edge thereof.

51. In a type making mechanism, the combination with means for moving the blank, of intermittently active heating means, means for moving this relatively to the blank, and means for actuating the heating means during such relative movement.

52. In type making mechanism, the combination with means for holding a blank and moving the same step by step, means for intermittently applying a blast of heat directly to the blank, and means for actuating the same to become effective at each step distance thereof.

53. In a typographic mechanism, the combination with means for moving a blank step by step, of means for directing a flame against the blank, and means for rendering the same effective at each step distance thereof.

Signed at Nos. 9-15 Murray street, New York, N. Y., this 22nd day of November, 1902.

FRANCIS H. RICHARDS.

Witnesses:
  PIERSON L. WELLS,
  JOHN O. SEIFERT.